United States Patent
Zhong et al.

(10) Patent No.: US 11,085,792 B2
(45) Date of Patent: Aug. 10, 2021

(54) SYSTEMS AND METHODS FOR DETERMINING ESTIMATED TIME OF ARRIVAL

(71) Applicant: BEIJING DIDI INFINITY TECHNOLOGY AND DEVELOPMENT CO., LTD., Beijing (CN)

(72) Inventors: Zhiyuan Zhong, Beijing (CN); Qing Luo, Beijing (CN); Zheng Wang, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 16/684,693

(22) Filed: Nov. 15, 2019

(65) Prior Publication Data
US 2020/0096361 A1    Mar. 26, 2020

Related U.S. Application Data

(63) Continuation of application No. PCT/CN2017/085375, filed on May 22, 2017.

(51) Int. Cl.
*G01C 21/36* (2006.01)
*G06F 16/22* (2019.01)
(Continued)

(52) U.S. Cl.
CPC ..... *G01C 21/3697* (2013.01); *G06F 16/2246* (2019.01); *G06N 5/04* (2013.01);
(Continued)

(58) Field of Classification Search
CPC ............ G01C 21/3697; G01C 21/3484; G06N 20/00; G06N 5/04; G08G 1/202;
(Continued)

(56) References Cited

U.S. PATENT DOCUMENTS 6,317,686 B1   11/2001  Ran
2011/0153192 A1  6/2011  Lin
(Continued)

FOREIGN PATENT DOCUMENTS

CN    103926606 A    7/2014
CN    104123841 A    10/2014
(Continued)

OTHER PUBLICATIONS

International Search Report PCT/CN2017/085375 dated Feb. 13, 2018, 4 pages.
(Continued)

*Primary Examiner* — Mussa A Shaawat
(74) *Attorney, Agent, or Firm* — Metis IP LLC

(57) ABSTRACT

A method for determining an estimated time of arrival (ETA) includes receiving a start location and a destination from a user device via a network. The method also includes obtaining a machine learning model for determining an ETA, which is generated according to a process including: obtaining historical data related to an on-demand service order; determining a high-dimensional sparse feature based on the historical data; and determining a machine learning model based on the high-dimensional sparse feature. The method further includes determining an ETA for a target route based on the machine learning model, the start location, and the destination, and transmitting the determined ETA to the user device via the network.

20 Claims, 10 Drawing Sheets

(51) Int. Cl.
*G06N 20/00* (2019.01)
*G06N 5/04* (2006.01)
*H04W 4/02* (2018.01)
*G01C 21/34* (2006.01)
*G08G 1/00* (2006.01)

(52) U.S. Cl.
CPC .............. *G06N 20/00* (2019.01); *H04W 4/02* (2013.01); *G01C 21/3438* (2013.01); *G08G 1/202* (2013.01)

(58) Field of Classification Search
CPC ........ G08G 1/0129; H04W 4/02; H04W 4/80; H04W 4/40; G06Q 10/04; G06Q 50/30
See application file for complete search history.

(56) References Cited

U.S. PATENT DOCUMENTS

| | | |
|---|---|---|
| 2011/0313957 A1 | 12/2011 | Ide et al. |
| 2013/0151149 A1* | 6/2013 | Kristinsson .......... G01C 21/362 701/533 |
| 2014/0244143 A1 | 8/2014 | Elwart et al. |
| 2014/0248909 A1 | 9/2014 | Kuntagod et al. |
| 2015/0088417 A1 | 3/2015 | Cheng et al. |
| 2015/0168168 A1* | 6/2015 | Kustanowitz ......... G01S 5/0027 701/410 |
| 2016/0055605 A1 | 2/2016 | Kim et al. |
| 2016/0239903 A1* | 8/2016 | Othmer .............. G06Q 30/0635 |
| 2017/0154348 A1* | 6/2017 | Biswas .............. G06Q 30/0206 |
| 2017/0169535 A1* | 6/2017 | Tolkin .............. G06Q 10/06311 |
| 2017/0372235 A1* | 12/2017 | Dayama ................. G06Q 10/02 |
| 2018/0315148 A1* | 11/2018 | Luo ........................ G06Q 50/30 |
| 2018/0364062 A1* | 12/2018 | Wang ................. G01C 21/3492 |
| 2019/0316926 A1* | 10/2019 | Wang ................. G01C 21/3438 |

FOREIGN PATENT DOCUMENTS

| | | |
|---|---|---|
| CN | 104517155 A | 4/2015 |
| CN | 104637334 A | 5/2015 |
| CN | 105260471 A | 1/2016 |
| CN | 105702073 A | 6/2016 |
| CN | 105787082 A | 7/2016 |
| CN | 105868847 A | 8/2016 |
| CN | 106056950 A | 10/2016 |
| CN | 106156992 A | 11/2016 |
| TW | I494903 B | 8/2015 |

OTHER PUBLICATIONS

Written Opinion in PCT/CN2017/085375 dated Feb. 13, 2018, 4 pages.
Bprakhar Alasubramanian et al., An Adaptive Lang-Term Bus Arrival Time Prediction Model with Cyclic Variations, Journal of Public Transportation, 18(1): 1-18, 2015.
Chao Ma et al., F2M; Scalable Field-Aware Factorization Machines, 30th Conference on Neural Information Processing Systems (NIPS); 2016, 8 pages.
Notice of Allowance in TW Application No. 107114158 dated Dec. 2, 2019, 4 pages.
Office Action in TW Application No. 107114158 dated Apr. 10, 2019, 15 pages.

* cited by examiner

| Categorical Feature | One-hot Encoding |
|---|---|
| Sedan | 1 0 0 |
| Sport utility vehicle (SUV) | 0 1 0 |
| Multi-purpose vehicle (MPV) | 0 0 1 |

SYSTEMS AND METHODS FOR DETERMINING ESTIMATED TIME OF ARRIVAL

CROSS-REFERENCE TO RELATED APPLICATION

This application is a continuation of International Application No. PCT/CN2017/085375, filed on May 22, 2017, the contents of which are incorporated herein by reference.

TECHNICAL FIELD

The present disclosure generally relates to systems and methods for digital route planning, and in particular, systems and methods for determining estimated time of arrival (ETA).

BACKGROUND

On-demand transportation services, such as online taxi-hailing services, provides much convenience for people's daily travel. Through an online on-demand service platform, a requester may request an on-demand service through an application installed in a user equipment, such as a smartphone. Then a server of the platform may process the request and determining service providers to perform the on-demand service based on a plurality of different factors or conditions, such as an estimated time of arrival (ETA) to a specified location. It may be desirable to determine the ETA and provide an optimal route planning to meet the requester's needs.

SUMMARY

According to an aspect of the present disclosure, may include a storage device and at least one processor of an online on-demand service platform configured to communicate with the storage device. The storage device may include a set of instructions for determining an estimated time of arrival (ETA). When the at least one processor executing the set of instructions, the at least one processor may be directed to perform one or more of the following operations. The at least one processor may receive a start location and a destination from the user device via a network. The at least one processor may obtain a machine learning model for determining an ETA, wherein the machine learning model is generated according to a process including: obtaining historical data related to an on-demand service order; determining a high-dimensional sparse feature based on the historical data; and determining a machine learning model based on the high-dimensional sparse feature. The at least one processor may determine an ETA for a target route based on the machine learning model, the start location, and the destination. The at least one processor may transmit the determined ETA to the user device via the network.

According to another aspect of the present disclosure, a method may include one or more of the following operations. A server may receive a start location and a destination from a user device via network. The server may obtain a machine learning model for determining an ETA, wherein the machine learning model is generated according to a process including: obtaining historical data related to an on-demand service order; determining a high-dimensional sparse feature based on the historical data; determining a machine learning model based on the high-dimensional sparse feature. The server may determine an ETA for a target route based on the machine learning model, the start location, and the destination. The server may transmit the determined ETA to the user device via the network.

According to a further aspect of the present disclosure, a non-transitory machine-readable storage medium may include instructions. When the non-transitory machine-readable storage medium accessed by at least one processor of an online on-demand service platform, the instructions may cause the at least one processor to perform one or more of the following operations. The instructions may cause the at least one processor to receive a start location and a destination from the user device. The instructions may cause the at least one processor to obtain a machine learning model for determining an ETA, wherein the machine learning model is generated according to a process including: obtaining historical data related to an on-demand service order; determining a high-dimensional sparse feature based on the historical data; and determining a machine learning model based on the high-dimensional sparse feature. The instructions may cause the at least one processor to determine an ETA for a target route based on the machine learning model, the start location, and the destination. The instructions may cause the at least one processor to transmit the determined ETA to the user device via the network.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
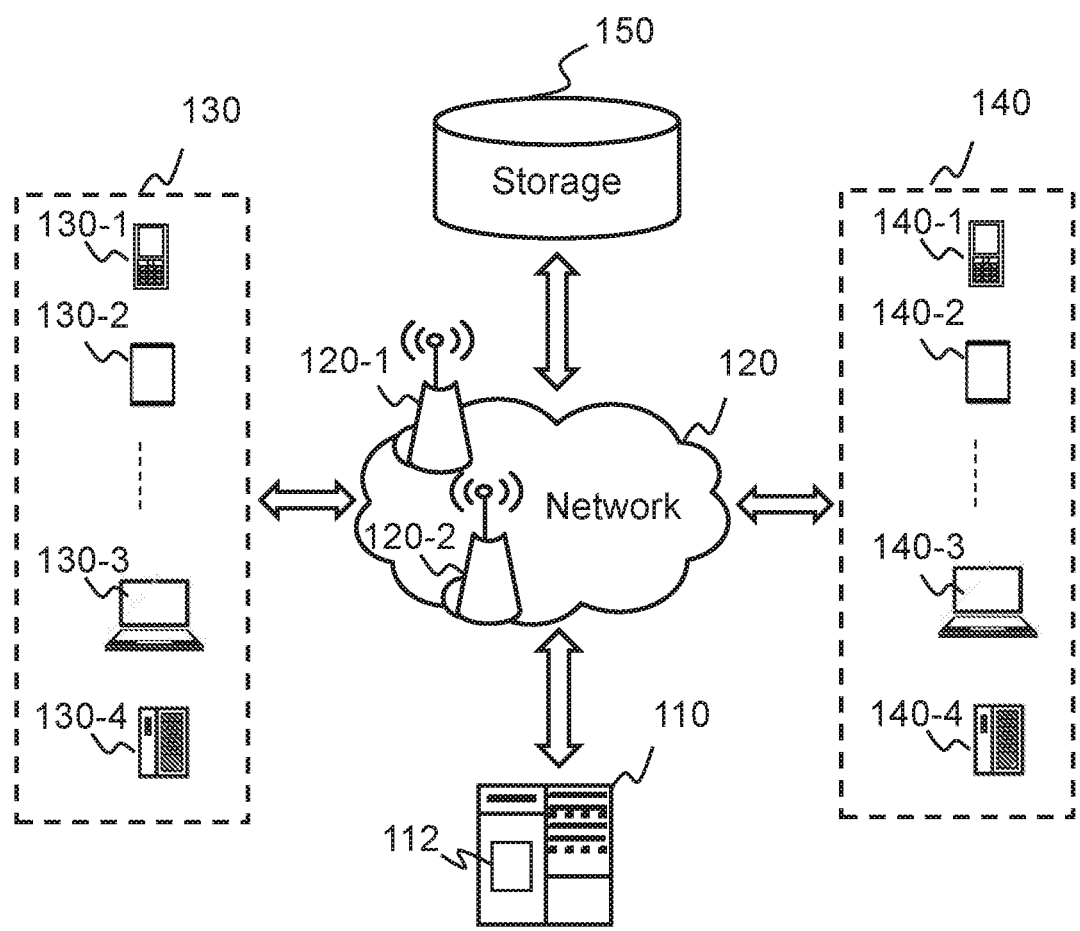
FIG. 1 is a block diagram illustrating an exemplary on-demand service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding determining estimated time of arrival for an on-demand service request, it should also be understood that this is only one exemplary embodiment. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a web page, a plug-in of a browser, a client terminal, a custom system, an internal analysis system, an artificial intelligence robot, or the like, or any combination thereof.

The term "passenger," "requester," "requestor," "service requester," "service requestor" and "customer" in the present disclosure are used interchangeably to refer to an individual, an entity, or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger" and "passenger terminal" may be used interchangeably, and "driver" and "driver terminal" may be used interchangeably.

The term "service," "request," and "service request" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to online systems and methods for determining an estimated time of arrival (ETA). The systems and methods may do so based on a machine learning model for determining the ETA, a start location, and a destination. When determining the machine learning model, the systems and methods may determine a high-dimensional sparse feature based on a set of historical data related to on-demand service orders.

It should be noted that online on-demand transportation service, such as online taxi hailing including taxi hailing combination services, is a new form of service rooted only in post-Internet era. It provides technical solutions to users and service providers that could raise only in post-Internet era. In pre-Internet era, when a user hails a taxi on street, the taxi request and acceptance occur only between the passenger and one taxi driver that sees the passenger. If the passenger hails a taxi through telephone call, the service request and acceptance may occur only between the passenger and one service provider (e.g., one taxi company or agent). Online taxi, however, allows a user of the service to real-time and automatic distribute a service request to a vast number of individual service providers (e.g., taxi) distance away from the user. It also allows a plurality of service provides to respond to the service request simultaneously and in real-time. Therefore, through Internet, the online on-demand transportation systems may provide a much more efficient transaction platform for the users and the service providers that may never be met in a traditional pre-Internet transportation service system.

FIG. 1 is a block diagram of an exemplary on-demand service system 100 according to some embodiments of the present disclosure. For example, the on-demand service system 100 may be an online transportation service platform for transportation services such as taxi hailing service, chauffeur service, express car service, carpool service, bus service, driver hire and shuttle service. The on-demand service system 100 may be an online platform including a server 110, a network 120, a requester terminal 130, a provider terminal 140, and a storage 150. The server 110 may include a processing engine 112.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the requester terminal 130, the provider terminal 140, and/or the storage 150 via the network 120. As another example, the server 110 may connect to the requester terminal 130, the provider terminal 140, and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions of the server 110 described in the present disclosure. For example, the processing engine 112 may collect information of a plurality of historical on-demand services, and determine an ETA to a specified location. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the on-demand service system 100 (e.g., the server 110, the requester terminal 130, the provider terminal 140, and the storage 150) may transmit information and/or data to other component(s) in the on-demand service system 100 via the network 120. For example, the server 110 may receive a service request from the requester terminal 130 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information between them.

In some embodiments, a requester may be a user of the requester terminal 130. In some embodiments, the user of the requester terminal 130 may be someone other than the requester. For example, a user A of the requester terminal 130 may use the requester terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may user the provider terminal 140 to receive a service request for a user D, and/or information or instructions from the server 110. In some embodiments, "requester" and "requester terminal" may be used interchangeably, and "provider" and "provider terminal" may be used interchangeably.

In some embodiments, the requester terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the requester terminal 130 may be a device with positioning technology for locating the position of the requester and/or the requester terminal 130.

In some embodiments, the provider terminal 140 may be similar to, or the same device as the requester terminal 130. In some embodiments, the provider terminal 140 may be a device with positioning technology for locating the position of the provider and/or the provider terminal 140. In some embodiments, the requester terminal 130 and/or the provider terminal 140 may communicate with another positioning device to determine the position of the requester, the requester terminal 130, the provider, and/or the provider terminal 140. In some embodiments, the requester terminal 130 and/or the provider terminal 140 may send positioning information to the server 110.

The storage 150 may store data and/or instructions. In some embodiments, the storage 150 may store data obtained from the requester terminal 130 and/or the provider terminal 140. In some embodiments, the storage 150 may store data and/or instructions that the server 110 may execute or use to perform exemplary methods described in the present disclosure. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components of the on-demand service system 100 (e.g., the server 110, the requester terminal 130, the provider terminal 140, etc.). One or more components of the on-demand service system 100 may access the data or instructions stored in the storage 150 via the network 120. In some embodiments, the storage 150 may be directly connected to or communicate with one or more components of the on-demand service system 100 (e.g., the server 110, the requester terminal 130, the provider terminal 140). In some embodiments, the storage 150 may be part of the server 110.

In some embodiments, one or more components of the on-demand service system 100 (e.g., the server 110, the requester terminal 130, the provider terminal 140.) may access the storage 150. In some embodiments, one or more components of the on-demand service system 100 may read and/or modify information relating to the requester, provider, and/or the public when one or more conditions are met. For example, the server 110 may read and/or modify one or more users' information after a service. As another example, the provider terminal 140 may access information relating to the requester when receiving a service request from the requester terminal 130, but the provider terminal 140 may not modify the relevant information of the requester.

In some embodiments, information exchanging of one or more components of the on-demand service system 100 may be achieved by way of requesting a service. The object of the service request may be any product. In some embodiments, the product may be a tangible product or immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle), a car (e.g., a taxi, a bus, a private car), a train, a subway, a vessel, an aircraft (e.g., an airplane, a helicopter, a space shuttle, a rocket, a hot-air balloon), or the like, or any combination thereof.

Figure 2:
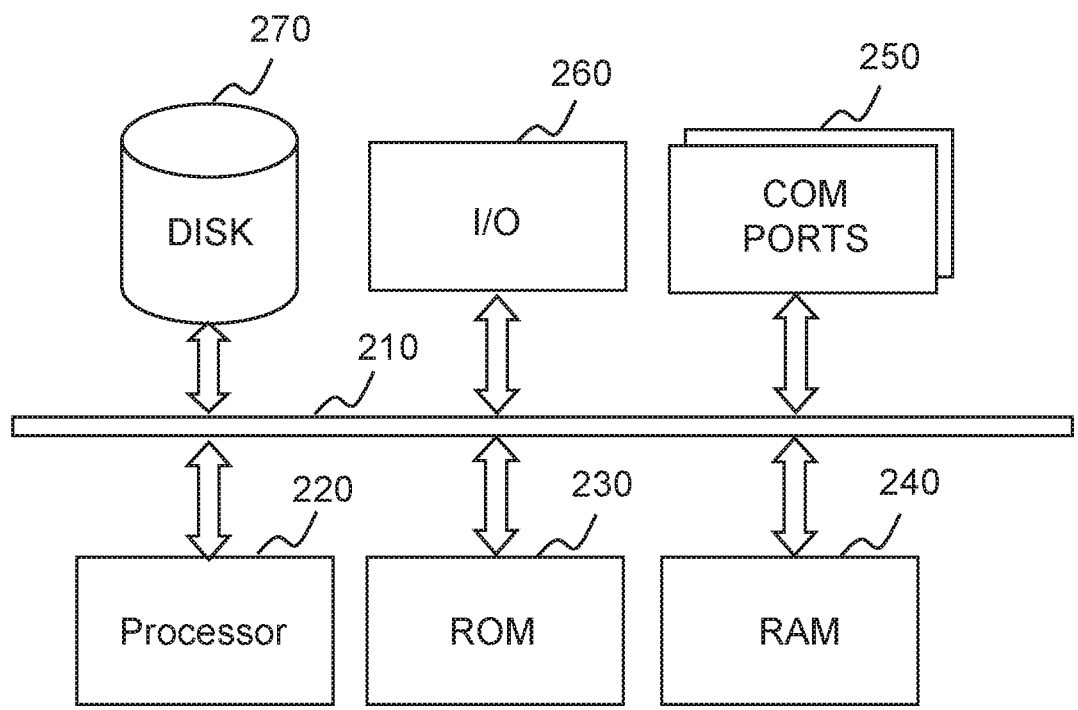
FIG. 2 is a schematic diagram illustrating an exemplary computing device in the on-demand service system according to some embodiments of the present disclosure.

FIG. 2 is a schematic diagram illustrating exemplary hardware and software components of a computing device 200 on which the server 110, the requester terminal 130, and/or the provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be a general-purpose computer or a special purpose computer; both may be used to implement an on-demand system for the present disclosure. The computing device 200 may be used to implement any component of the on-demand service system as described herein. For example, the processing engine 112 may be implemented on the computing device 200, via its hardware, software program, firmware, or any combination thereof.

The computing device 200, for example, may include COM ports 250 connected to and from a network connected thereto to facilitate data communications. The computing device 200 may also include a processor 220 for executing program instructions. The exemplary computing device may include an internal communication bus 210, program storage and data storage of different forms including, for example, a disk 270, and a read only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computing device and other components therein. The computing device 200 may also receive programming and data via network communications.

Merely for illustration, only one processor is described in FIG. 2. Multiple processors are also contemplated; thus operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3A:
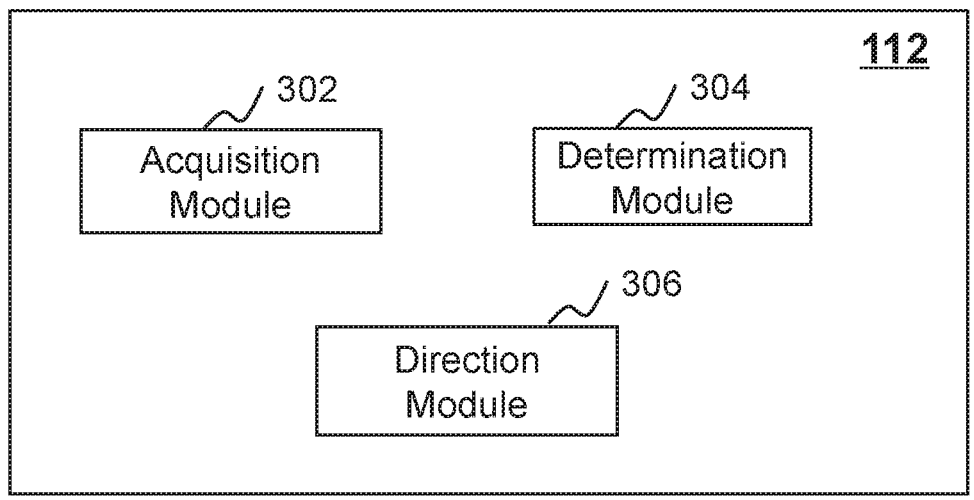
FIG. 3A is a block diagram illustrating an exemplary processing engine according to some embodiments of the present disclosure.

FIG. 3A is a block diagram illustrating an exemplary processing engine 112 according to some embodiments of the present disclosure. The processing engine 112 may include an acquisition module 302, a determination module 304, and a direction module 306. Each module may be a hardware circuit that is designed to perform the following actions, a set of instructions stored in one or more storage media, and/or a combination of the hardware circuit and the one or more storage media.

The acquisition module 302 may be configured to obtain a plurality of service requests from one or more requesters. In some embodiments, a service request may be a request for an on-demand service (e.g., a transportation service, a goods delivery service) by the requester. For example, if a passenger needs a taxi service, the passenger may send a taxi hailing request to the server 110 from the requester terminal 130 through the network 120. In some embodiments, the service request may be a request for map navigation service by the requester. For example, the driver may follow navigation instructions by using a navigation application and/or apparatus. The service request may include a start location, a destination, a driving time (or travelling duration), a type of service, or the like, or any combination thereof. The requester may define the destination. The acquisition module 302 may obtain the service request from the requester terminal 130 via the network 120. The service request may be transmitted to the determination module 304 or the direction module 306 to be further processed.

The on-demand service may include a taxi hailing service, a chauffeur service, an express car service, a carpool service, a bus service, a short-term driver-renting service, a shuttle service, a test drive service, a designated driving service, or the like, or a combination thereof. In some embodiments, the on-demand service may be other delivery services booked on-line, such as on-line booking a meal, on-line shopping, or the like, or a combination thereof. In some embodiments, the on-demand service may be a service of taking an object from one place to another in a vehicle, such as goods delivery. The vehicle may include a non-motor vehicle (e.g., a bicycle or a tricycle), a motor vehicle (e.g., a car or truck), watercraft (e.g., a ship or a boat) and/or an aircraft. In some embodiments, the vehicle may be unmanned. For example, the on-demand service may be a taxi service.

The acquisition module 302 may further obtain historical data related to a plurality of service orders (i.e., completed service requests). For example, the on-demand service system 100 may generate a service order based on an on-demand service request sent by a requester and save it into a storage (e.g., the storage 150), where the service order may be recorded and categorized. As another example, for a taxi hailing service, if a driver accepts the service request and completes the service, the on-demand service system 100 may generate a service order including information associated with the service request, passenger information, driver information, and/or any other information associated with a target route of the service request. The on-demand service system 100 may transmit the service order to the passenger and/or the driver. As a further example, for a map navigation service, if a requester send a service request to the server 110 from the requester terminal 130 through the network 120, the on-demand service system 100 may recommend one or more routes base on the service request, and, after the requester confirming a target route of the service request (or the driver arrives at the destination), the on-demand service system 100 may generate a service order including information associated with the service request and/or the confirmed target route.

The acquisition module 302 may extract and/or obtain historical data related to the service order. For example, the acquisition module 302 may obtain the historical data from the requester terminal 130, the provider terminal 140 and/or storage 150 via the network 120 and recorded in the storage 150 or any component of the on-demand service system 100. The historical data related to the service order may include a start location, a destination, an actual time of arrival (ATA), route information (e.g., driving distance from the start location to the destination, road condition), traffic light information (e.g., the number of traffic light, light timing of a traffic light, provider information (e.g., vehicle speed, overtaking frequency, driving experience), weather condition, traffic accident information, or the like, or any combination thereof. The acquisition module 302 may transmit the historical data to the determination module 304 or the direction module 306 to be further processed.

The determination module 304 may be configured to determine a machine learning model based on the historical data. The historical data may be associated with an N-dimensional coordinate system. Each dimension may be associated with a property or feature of a route. The historical data may be further analyzed by the determination module 340 or be included in a training set, which may include a plurality of training samples. The machine learning model may be generated and/or trained by the determination module 340 using the training set.

The determination module 304 may further update the machine learning model with an online learning method. The machine learning model may be updated by using updating data. The updating data may be associated with one or more new service orders. In some embodiments, the new service orders may be obtained within a time period (e.g., every three months). In some embodiments, the new service orders may be obtained based on the number of service orders (e.g., every 10, 100, 1,000, or 10,000 service orders).

In some embodiments, the machine learning model may be stored in a storage device as an application or part thereof, which may be used in a user terminal (e.g., a driver terminal) or an online platform (e.g., a server). For example, the machine learning model may be transmitted to a smartphone that may be used as a driver terminal for the transportation service, and the driver may log in the application for determining the ETA from one location to another location. As another example, the machine learning model may be stored in the on-demand service system 100 (e.g., the storage 150), and a passenger may download or use the machine learning model online via the network 120 or a wired connection. In some embodiments, the machine learning model may be stored in a storage medium. For example, the machine learning model may be stored in a non-transitory computer-readable storage medium (e.g., a universal serial bus (USB) flash disk), which may be used by on-demand service system 100 or a user terminal (e.g., a passenger terminal).

The determination module 304 may be further configured to determine an estimated time of arrival (ETA) for a target route based on the machine learning model and/or the updated machine learning model. An ETA for a target route may be a time duration from a start location to a destination related to a service request. For example, the determination module 304 may determine the ETA for the target route between the start location and the destination as 5 minutes, 2 hours, or 6 hours. As another example, the determination module 304 may further adjust the ETA for the target route between the start location and the destination dynamically based on a weather condition (e.g., haze or thunderstorm) or traffic accident information.

The direction module 306 may be configured to cause the requester terminal (e.g., a driver terminal) and/or provider the terminal to display the ETA. For example, the direction module 306 may send ETA information relating to an on-demand service request to the requester terminal 130 via the network 120. The ETA information relating to the on-demand service request may include the start location, the destination, the ETA, the directions, the map, or the like, or a combination thereof.

The modules of the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Any two of the modules may be combined into a single module, any one of the modules may be divided into two or more units. For example, the acquisition module 302 may be integrated into the determination module 304 as a single module, which may both obtain historical data of service orders and determine a machine learning model based on the historical data.

Figure 3B:
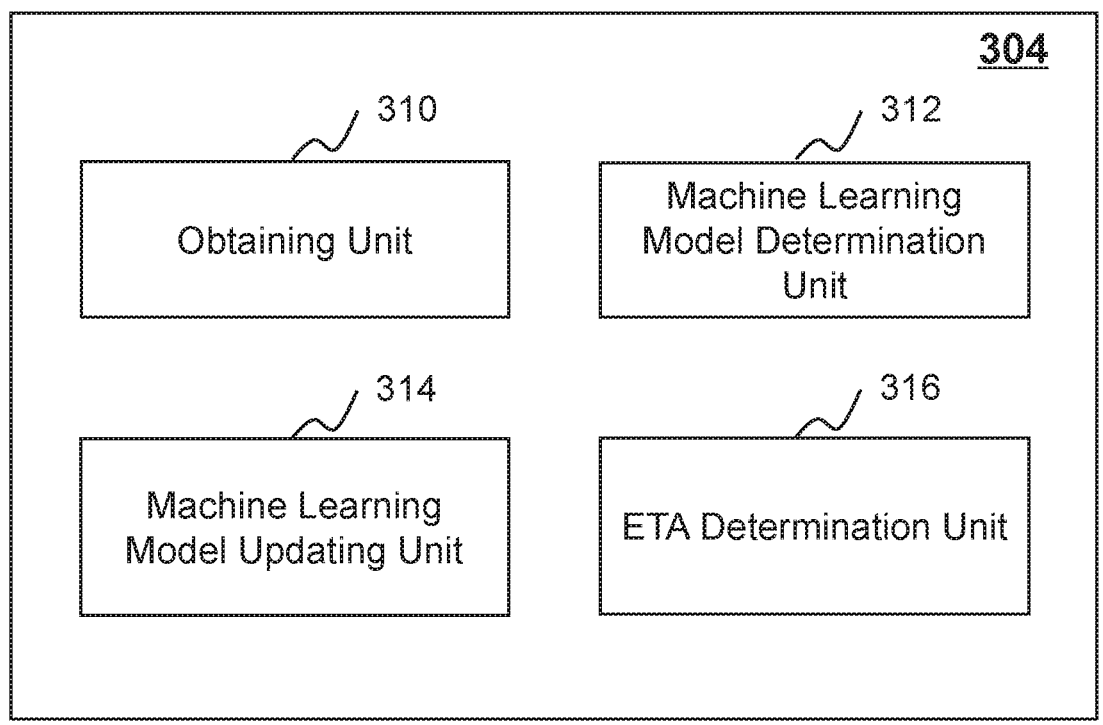
FIG. 3B is a block diagram illustrating an exemplary determination module according to some embodiments of the present disclosure.

FIG. 3B is a block diagram illustrating an exemplary determination module 304 according to some embodiments of the present disclosure. The determination module 304 may include an obtaining unit 310, a machine learning model determination unit 312, a machine learning model updating unit 314, and an ETA determination unit 316. Each unit may be a hardware circuit that is designed to perform the following actions, a set of instructions stored in one or more storage media, and/or a combination of the hardware circuit and the one or more storage media.

The obtaining unit 310 may be configured to obtain historical data related to a plurality of service orders (i.e., completed service requests). The obtaining unit 310 may obtain the historical data from a storage device (e.g., the database 150, a storage module (not shown) integrated in the processing engine 112, etc.) disclosed elsewhere in the present disclosure.

The machine learning model determination unit 312 may be configured to determine a machine learning model. The machine learning model determination unit 312 may determine a high-dimensional sparse feature based on the historical data. The historical data may be included in a training set, which may include a plurality of training samples. The machine learning model determination unit 312 may determine and/or train a machine learning model using the high-dimensional sparse feature.

The machine learning model updating unit 314 may be configured to update the machine learning model with an on-line learning method. The machine learning model updating unit 314 may update the machine learning model using updating data. The updating data may be associated with one or more new service orders based on the number of service orders (e.g., every 10, 100, 1,000, or 10,000 service orders).

The ETA determination unit 316 may be configured to determine an ETA for a target route. The ETA determination unit 316 may determine the ETA for the target route based on a start location, a destination, and the machine learning model and/or the updated machine learning model. The start location and the destination may be received from a user terminal for a service request. The ETA determination unit 316 may further adjust the ETA for the target route between the start location and the destination dynamically based on a weather condition.

Figure 4:
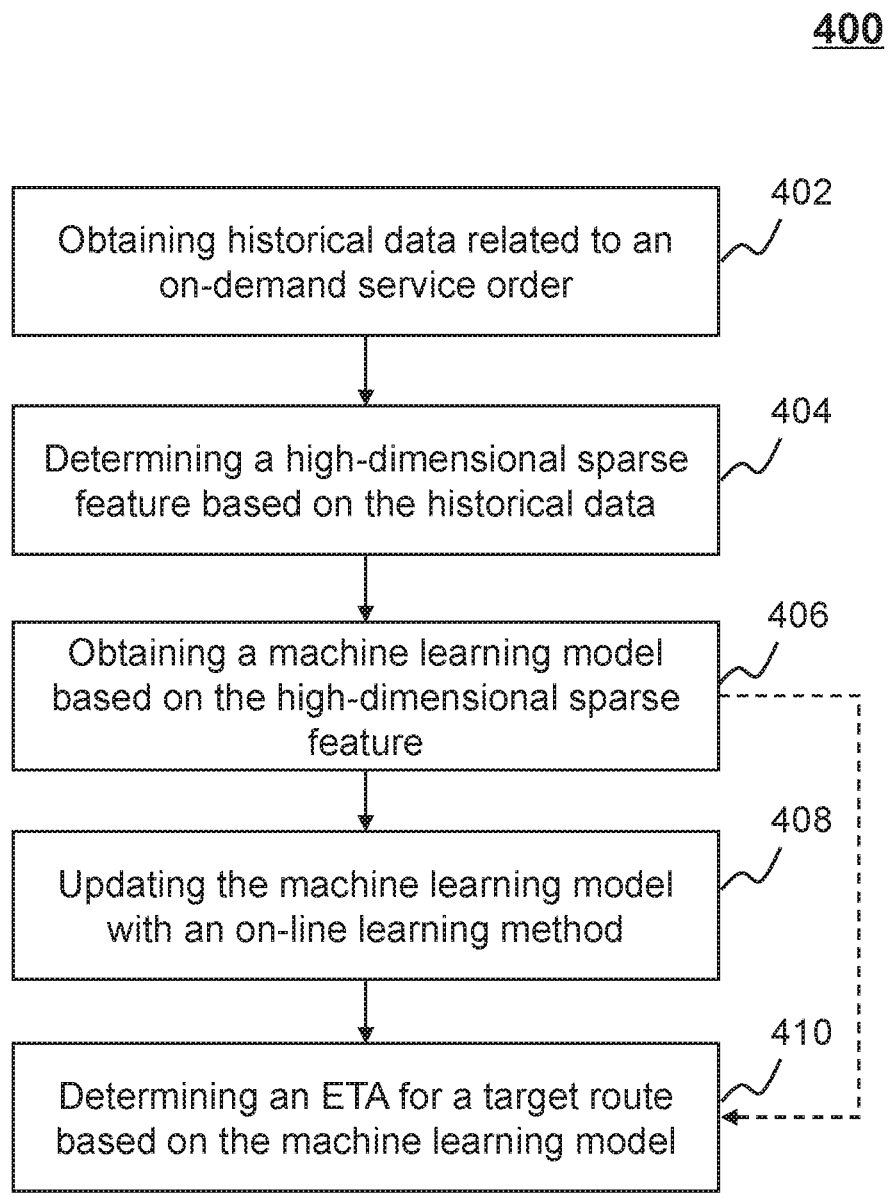
FIG. 4 is a flowchart illustrating an exemplary process for determining an ETA for a target route according to some embodiments of the present disclosure.

FIG. 4 is a flowchart illustrating an exemplary process for determining an ETA for a target route according to some embodiments of the present disclosure. In some embodiments, the process 400 may be executed by the on-demand service system 100. For example, the process 400 may be implemented as a set of instructions (e.g., an application) stored in storage 150, storage ROM 230 and/or RAM 240. The processing engine 112 may execute the set of instructions, and when executing the instructions, it may be configured to cause the server 110 to perform the process 400 in an online on-demand service platform. The platform may be an Internet-based platform that connects on-demand service providers and requestors through the Internet.

In 402, the processing engine 112 (e.g., the acquisition module 302, or the obtaining unit 310) may obtain historical data related to one or more on-demand service order. The on-demand service orders may be generated based on on-demand service requests, which may be recorded and categorized in a storage (e.g., the storage 150). The on-demand service orders may be recorded within a time period. The time period may be a time period manually set by a user or an administrator of the on-demand service system 100 or adaptively set by the processing engine 112 (e.g., collecting a certain number of on-demand service orders).

The historical data related to the on-demand service order may include basic route information, vehicle information, provider information, or the like, or a combination thereof. The basic route information may include the start location, the destination, the mileage of the route, the start and/or pick-up time, the actual time of arrival (ATA), the congested portion of the route (e.g., the congested road during rush hours), the road condition, the traffic light information of the route (e.g., the number of traffic light, timing length of a traffic light), involving toll or not, or the like, or a combination thereof. The vehicle information may include the driving mode (e.g., the automation mode, the manual mode), the vehicle type (e.g., sedan, sport utility vehicle (SUV), multi-purpose vehicle), the number of occupants (for high-occupancy vehicle (HOV) lanes), or the like, or a combination thereof. The provider information may include the driver's driving experience (e.g., the driving mileages, years of driving), preferred driving speed, overtaking frequency, the gender, the date of birth, etc.

In some embodiments, the historical data may be encoded by the processing engine 112 using an electrical signal. The electrical signal encoding historical data related to with the route may be generated by a driver terminal or a passenger terminal. For example, the driver terminal implemented by the provider terminal 140 (e.g., a smartphone) may transmit the electrical signal to the processing engine 112. The processing engine 112 may receive the electrical signal. In some embodiments, the component of the on-demand service system 100 may transmit the electrical signal via a wired connection or a wired connection. For example, the processing engine 112 may obtain the electrical signal from the storage 150 via the network 120.

In 404, the processing engine 112 (e.g., the determination module 304, or the machine learning model determination unit 312) may determine a high-dimensional sparse feature based on the historical data. For example, the processing engine 112 may obtain and/or extract a feature from the historical data and further determine a high-dimensional sparse feature based on the feature. The feature may influence the travelling time along a route. For example, if a section of a road is in a traffic jam due to a car accident, the travelling time along a route that includes the road section may be longer than that in normal conditions or that along a route that does not include that road section.

The feature may be encoded into a digital form by using, for example, a gradient boosting decision tree (GBDT) algorithm, a one-hot encoding algorithm, or the like, or any combination thereof. For example, if a feature of a route is a categorical feature, the processing engine 112 may use a one-hot encoding algorithm to encode the feature into a digital form. As another example, if the feature of the route is a continuous feature, the processing engine 112 may use a GBDT algorithm to encode the feature into digital form. As a further example, if the feature of the route is a combination of the categorical feature and the continuous feature, the processing engine 112 may use a one-hot encoding algorithm and/or GBDT algorithm to encode the feature into digital form. Detailed process and/or method of determining the high-dimensional sparse feature based on the historical data is described elsewhere in this disclosure (e.g., in connection with FIG. 5).

Figure 5:
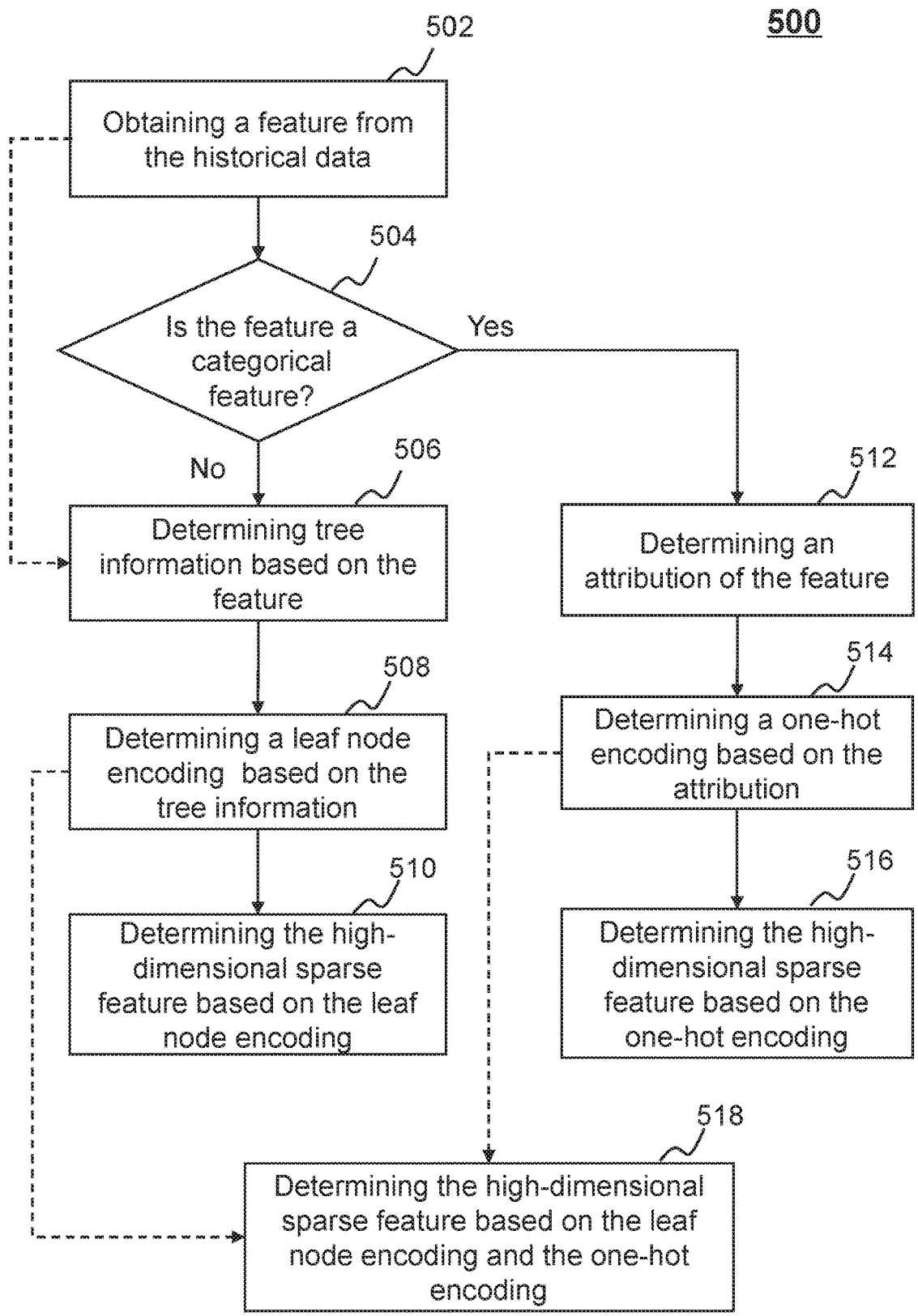
FIG. 5 is a flowchart illustrating an exemplary process for determining a high-dimensional sparse feature according to some embodiments of the present disclosure.
Figure 6A:
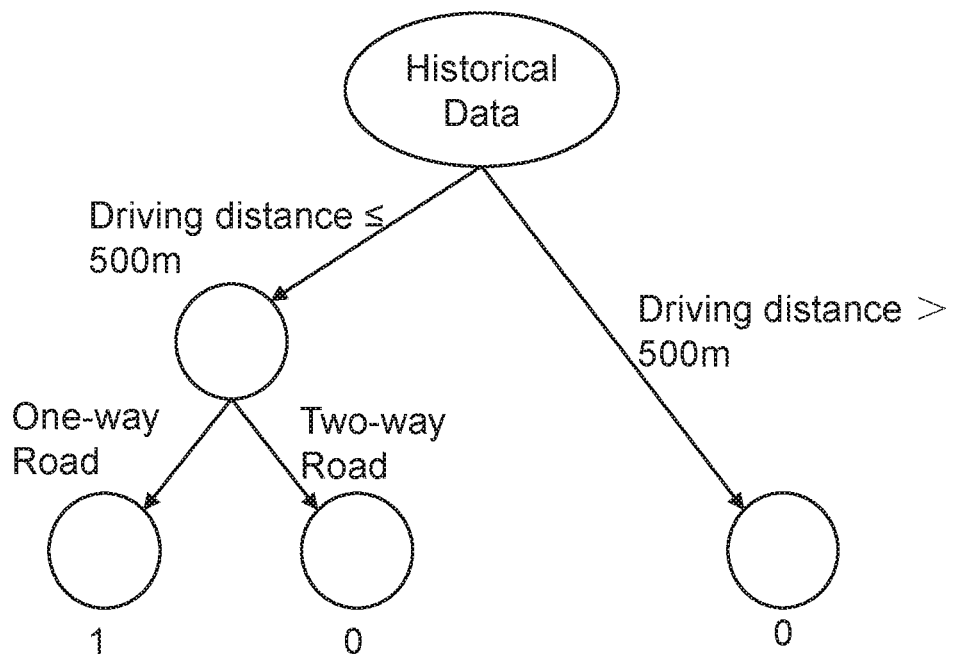
FIGS. 6A-6E are schematic diagrams illustrating exemplary diagrams for determining the high-dimensional sparse feature according to some embodiments of the present disclosure.
Figure 6B:
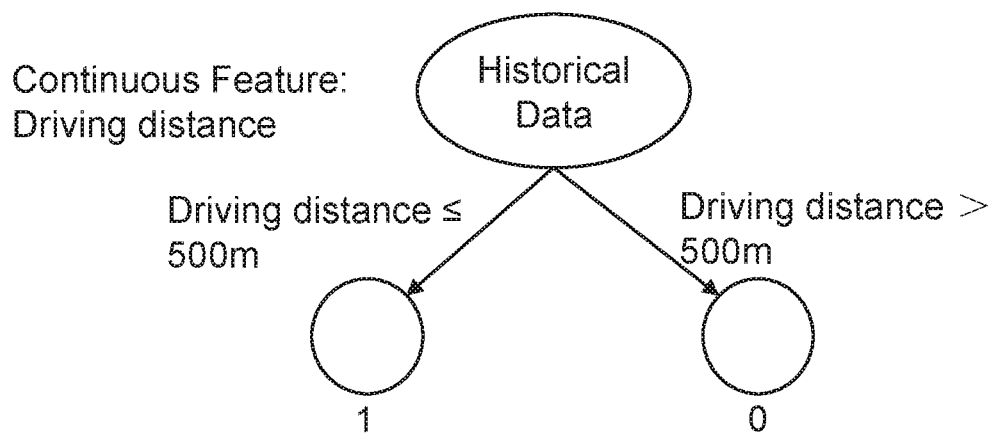
Figure 6C:
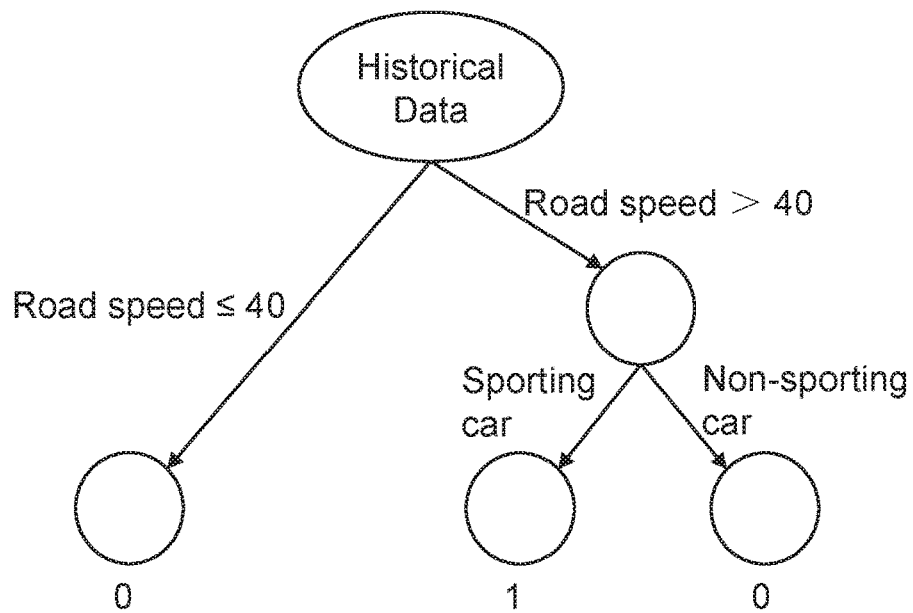
Figure 6D:
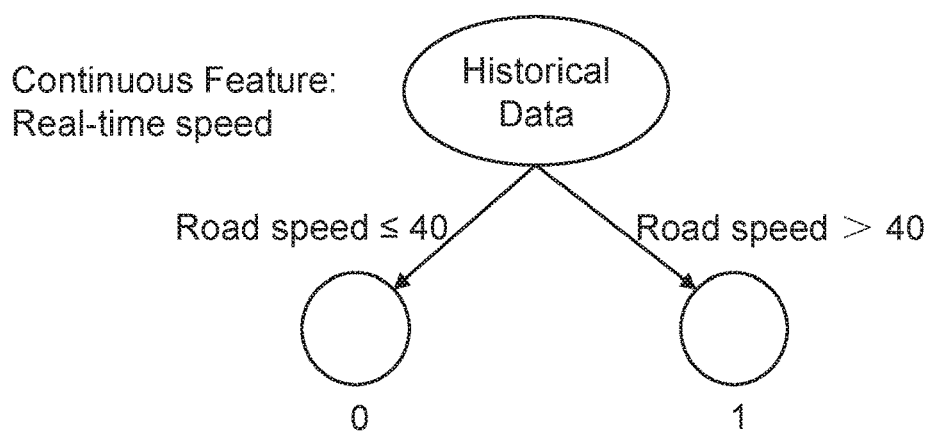
Figure 6E:
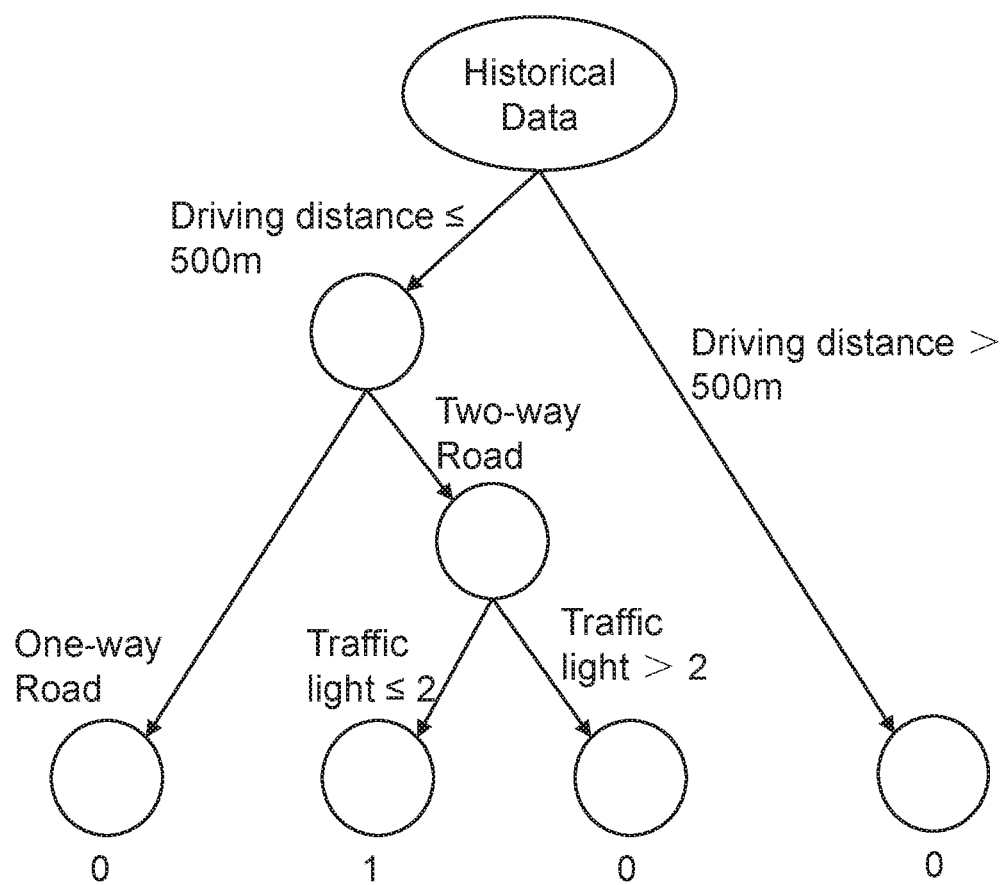

FIG. 5 is a flowchart illustrating an exemplary process for determining the high-dimensional sparse feature according to some embodiments of the present disclosure. In some embodiments, the process 500 may be executed by the on-demand service system 100. For example, the process 500 may be implemented as a set of instructions (e.g., an application) stored in storage 150, storage ROM 230 and/or RAM 240. The processing engine 112 may execute the set of instructions, and when executing the instructions, it may be configured to cause the server 110 to perform the process 500 in an online on-demand service platform. The platform may be an Internet-based platform that connects on-demand service providers and requestors through the Internet.

In 502, the processing engine 112 (e.g., the acquisition module 302, or the obtaining unit 310) may obtain and/or extract a feature from the historical data. The feature may be a characteristic of a route. The route may have a plurality of road sections. The road sections may be divided based on, at least in part, levels of road, traffic lights, cities, provinces, countries, geographical conditions, traffic identification that related to the road or the route, or the like, or any combination thereof. For example, the road sections may be divided based on the levels of the road. The levels of the road may include a first-class highway, a second-class highway, a third-class highway, sections of local roads, or the like, or any combination thereof. As another example, the road sections may be divided based on the traffic lights and/or highway exits, etc. Accordingly, a route may include a first road section, a second road section, a third section, . . . , Nth road section. Two road sections adjacent to each other may be linked to at least one traffic light. As still another example, the road sections may be divided based on the geographical conditions. For example, a river, a bridge, a railway, a toll station, or the like, or any combination thereof may be used to divide a road adjacent thereto into two road sections.

The feature may include the traffic status, the total driving distance of the route (or the travelled distance), the start time, the end time, the start location, the destination, the sequence of satellite positioning sampling points, the driving distance on a specified level of road(s), the number of road sections, the number of crossroads with traffic lights, the light timing of each traffic light, the number of crossroads without traffic lights, the vehicle status, the driving experience of the driver, or the like, or any combination thereof.

The traffic status may include an average vehicle moving speed on the road (real-time or estimated). The driving distance may include the total distance of the route or distance in each of the road sections. The start time may include a time of a requester being picked up, a time that a user (e.g., a driver) receives or confirms a service request, and/or a time that a requester starts a map navigation service (e.g., through a navigation application installed in a smartphone operated by the user). The start location may be a location where a passenger was picked up, a location for a passenger to wait for a driver, and/or a location where a requester starts a map navigation service. The sequence of satellite positioning sampling points may be a sequence including vehicle positions and/or requester positions that may be determined by a positing technology (e.g., GPS). The driving distance from a specified level of the road may be a distance that a vehicle drives on a specified level of the road, such as a highway, a local road, a first-class road, a second-class road, a third-class road, a toll road, etc. The light timing of each traffic light may be a time that each traffic light on and/or off, or a time duration of each traffic light on. For example, a driver may stop the vehicle at the red light and continue to drive when the light turn green. As another example, a time duration of green light on may allow the driver to start and/or keep driving. The number of road sections may be a total number of the road sections in one route. The vehicle status may include an access status (e.g., the availability to accept the service request.) to the transportation service request, a response probability, a preference of a driver, a vehicle type, a driving mode, a current number of passengers in the vehicle, a maximum passenger capacity of the vehicle, a color of the vehicle, a service level of the driver, a current speed of the vehicle, or any information relative to the vehicle, or the like, or any combination thereof. The driving experience may include driving mileage of the driver, years of driving, overtaking frequency, preferred driving speed, or the like, or any combination thereof.

In some embodiments, the feature may be obtained and/or extracted based on, at least in part, other factors, such as the information received from other resources (e.g., a weather forecasting system, a traffic guidance system, or a traffic radio system). The information may include weather condition, traffic accident information, traffic congestion condition, traffic restriction, or any information related to the route. The weather condition may include real-time weather information, substantially real-time weather information, weather forecast information, etc. The processing engine 112 may obtain the information from the storage 150, a weather condition platform (e.g., a weather forecast website), a traffic guidance platform, and/or any other device providing the information. For example, the feature may be determined based on the data associated with the route and the traffic condition related to the route.

In some embodiments, the feature may include a categorical feature or continuous feature. As used herein, a categorical feature generally refers to a feature that can take a value from a small set of discrete values (usually fixed) on the basis of some qualitative property. A continuous feature used herein generally refers to a feature that can take values from an infinite set of values.

In some embodiments, the categorical feature may include the start location, the destination, the level of road, the vehicle type, the driving mode, the color of the vehicle, the road condition, the weather condition, the traffic congestion condition, the traffic restriction, or the like, or any combination thereof. For example, if the vehicle type includes sedan, SUV and MPV, the processing engine 112 may determine the vehicle type being a categorical feature. In some embodiments, the continuous feature may include the driving distance, the travelling duration along the route, the number of traffic light, the light timing of a traffic light, the vehicle speed, the overtaking frequency, the traffic status, the number of road sections, the number of crossroads with traffic lights, the light timing of each traffic light, the number of crossroads without traffic lights, or the like, or any combination thereof.

In 504, the processing engine 112 (e.g., the determination module 304, or the machine learning model determination unit 312) may determine whether the feature is (or includes) a categorical feature. If the processing engine 112 determines that the feature is a categorical feature, the processing engine 112 may determine the high-dimensional sparse feature based on the feature by using a one-hot encoding algorithm. On the other hand, the processing engine 112 determines that the feature is not (or does not include) a categorical feature, the processing engine 112 may determine the high-dimensional sparse feature by using a GBDT algorithm.

In some embodiments, if the processing engine 112 determines that a feature is not (or does not include) a categorical feature, the processing engine 112 may determine whether the feature includes a continuous feature.

In some embodiments, the feature may include a plurality of features including, for example, the categorical features, the continuous features, or the like, or any combination thereof. For example, as illustrated in FIGS. 6-A and 6-B, when the feature includes the driving distance and the road type, the processing engine 112 may determine the driving distance as a continuous feature and the road type as a categorical feature. In some embodiments, the processing engine 112 may skip step 504 and proceed to step 506. For example, if the processing engine 112 determines that the number of categorical features is less than a predetermined value, the processing engine 112 may determine the high-dimensional sparse feature based on the categorical feature and the continuous feature by using the GBDT algorithm (e.g., as shown in FIGS. 6-A, 6-C, and 6-E).

In some embodiments, in response to the determination that the feature is (or includes) a categorical feature, the processing engine 112 (e.g., the determination module 304, or the machine learning model determination unit 312) may proceed to step 512 and determine an attribution of the feature. The attribution of the feature may be the number of possible states included in the feature, and the states included in the feature may be mutually exclusive. For example, as illustrated in FIG. 6-B, the number of the possible states included in road type is two (e.g., one-way road and two-way road), the processing engine 112 may determine the attribution of the road type being two. As another example, as illustrated in FIG. 6-D, the number of the possible states included in the vehicle type is three (e.g., sedan, SUV, and MPV), the processing engine 112 may determine the attribution of the road type being three.

In 514, the processing engine 112 (e.g., the determination module 304, or the machine learning model determination unit 312) may determine a one-hot encoding based on the attribution. The one-hot encoding may represent the possible states included in the feature, in the form of, for example, a vector, a matrix, or the like, or any combination thereof. For example, the one-hot encoding may include a binary vector representing the state "valid" or "invalid" (e.g., "1" represents the state "valid," and "0" represents the state "invalid"). In some embodiments, the one-hot encoding may include one-dimension element, two-dimension elements, three-dimension elements, . . . , N-dimension (where N is an integer) elements, associated with the attribution. For example, if the attribution of the road type (i.e., a feature) is two, the processing engine 112 may determine the one-hot encoding of the road type being two-dimension (e.g., ["One-way road," "Two-way road" ]). As illustrated in FIG. 6-B, [1, 0] may represent a one-hot encoding of one-way road, which may indicate that the road is a one-way street. And [0, 1] may represent a one-hot encoding of two-way road, indicating that the road is a two-way street. As another example, if the attribution of the vehicle type is three, the processing engine 112 may determine the one-hot encoding of the vehicle type being three-dimension (e.g., ["Sedan," "SUV," "MPV" ]). As illustrated in FIG. 6-D, [1, 0, 0] may represent one-hot encoding of sedan, [0, 1, 0] may represent one-hot encoding of SUV, and [0, 0, 1] may represent one-hot encoding of MPV.

In 516, the processing engine 112 (e.g., the determination module 304, or the machine learning model determination unit 312) may determine the high-dimensional sparse feature based on the one-hot encoding. The high-dimensional sparse feature may be a mathematical expression (e.g., a vector or a matrix) to describe characteristics of a route as a whole. In some embodiments, a route may include a plurality of features, such as hundreds of features, thousands of features, millions of features, etc. The processing engine 112 may determine the high-dimensional sparse feature including partial and/or all of the one-hot encodings associated with the plurality of features. For example, for a taxi hailing service order, if features of a route includes one-way road and SUV (e.g., ["one-way road," "SUV" ], ["SUV," "one-way road" ]), the processing engine 112 may determine that a one-hot encoding of one-way road is [1, 0] and a one-hot encoding of SUV is [0, 1, 0], and the processing engine 112 may further determine that a high-dimensional sparse feature is [1, 0, 0, 1, 0].

In some embodiments, the route may include a plurality of road sections. The high-dimensional sparse feature may include not only features of individual road sections in the route, but also features that reflects interactions between different individual road sections. In some embodiments, the high-dimensional sparse feature may be a vector with one single column or one single row. The high-dimensional sparse feature may be associated with an N-dimensional coordinate system. Each dimension may be associated with one property or feature of the route. In some embodiments, the high-dimensional sparse feature may exclude the route's interaction relationship with another route. For example, the high-dimensional sparse feature may be determined according to one single route. In some embodiments, the high-dimensional sparse feature may include interaction relationship between different routes. For example, the high-dimensional sparse feature of a target route may be determined according to two or more routes (e.g., hundreds of routes, thousands of routes, or millions of routes) of which the road condition may affect that of the target route. The high-dimensional sparse feature may be further be included in a training set, which may include a plurality of training samples. In some embodiments, each of the plurality of training samples may be associated with historical data of each on-demand service order. For example, if a taxi hailing service order is completed, the processing engine 112 may determine that a high-dimensional sparse feature associated with historical data of the taxi hailing service order may be a training sample and save the data related to the service order as a training sample into a storage device. The high-dimensional sparse feature and/or the training set may be used to train and/or establish a model by using a machine learning method as described elsewhere in this disclosure.

In some embodiments, in response to the determination that the feature is not (or does not include) a categorical feature (e.g., the feature is or includes a continuous feature), the processing engine 112 (e.g., the determination module 304, or the machine learning model determination unit 312) may proceed to step 506 and determine tree information based on the feature. The tree information may include the number of trees (e.g., one tree, two trees, . . . , N trees, where N is an integer), depth of a tree, or the like, or any combination thereof. The number of trees may be associated with the number of iterations. The number of iterations may be manually set by a user (via, for example, input of the server 110, the requester terminal 130, and/or the provider terminal 140) or an administrator of the on-demand service system 100, or adaptively set by the processing engine 112 (e.g., collecting a certain number of on-demand service orders). The depth of a tree may be related to the number of the features. For example, if the processing engine 112 determines that the number of the features is five and the tree iterates once, the processing engine 112 may determine that the number of trees is one and the depth of the tree is five. In some embodiments, the number of trees may be adaptively set based on the depth. For example, if the depth of a tree less than a predetermined value, the processing engine 112 may determine the number of trees based on the depth and total features.

In 508, the processing engine 112 (e.g., the determination module 304, or the machine learning model determination unit 312) may determine a leaf node encoding based on the tree information. The leaf node encoding may include a binary vector representing whether the state of a feature satisfying a condition (e.g., "1" may represent the state of feature satisfying the condition, "0" may represent the state of the feature not satisfying the condition). For example, as illustrated in FIG. 6-A, if the driving distance of the historical data including two features is not more than 500 meters, the processing engine 112 may determine that a leaf node encoding of "driving distance>500 m" is 0. And if the processing engine 112 determines that the road type of the historical data is one-way road, the processing engine 112 may also determine that a leaf node encoding of "one-way road" is 1 and a leaf node encoding of "two-way road" is 0. As another example, as illustrated in FIG. 6-E, if the processing engine 112 determines the driving distance of the historical data including three features is not more than 500 meters, the processing engine 112 may determine that a leaf node encoding of "driving distance>500 m" is 0. And if the processing engine 112 determines that the road type of the historical data is two-way road, the processing engine 112 may also determine that a leaf node encoding of "one-way road" is 0. Further, if the processing engine 112 determines that the number of traffic lights of the historical data is not more than two, the processing engine 112 may further determine that a leaf node encoding of "traffic light>2" is 0 and a leaf node encoding of "traffic light≤2" is 1.

In 510, the processing engine 112 (e.g., the determination module 304, or the machine learning model determination unit 312) may determine the high-dimensional sparse feature based on the leaf node encoding. The high-dimensional sparse feature may be a mathematical expression (e.g., a vector or a matrix) to describe characteristics of a route as a whole. The processing engine 112 may determine that the high-dimensional sparse feature includes partial and/or all of the leaf node encodings associated with the plurality of features. For example, as illustrated in FIG. 6-A, the processing engine 112 may determine that the high-dimensional sparse feature is [1, 0, 0]. As another example, as illustrated in FIG. 6-E, the processing engine 112 may determine that the high-dimensional sparse feature is [0, 1, 0, 0].

In some embodiments, the processing engine 112 may determine the high-dimensional sparse feature based on the categorical features of the plurality of features by using the one-hot encoding algorithm, and determine the high-dimensional sparse feature based on the continuous features of the plurality of features by using the GBDT algorithm (e.g., as shown in FIGS. 6-B and 6-D). For example, if the historical data including the categorical features and the continuous features, the processing engine 112 (e.g., the determination module 304, or the machine learning model determination unit 312) may proceed to step 518 and determine the high-dimensional sparse feature based on the leaf node and the one-hot encoding. In some embodiments, in 518, the processing engine 112 may input the leaf node and the one-hot encoding to a factorization machine (FM), and generate the high-dimensional sparse feature based on the leaf node, the one-hot encoding and the result of the FM.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Referring back to FIG. 4, the machine learning model based on the high-dimensional sparse feature obtained in step 406 may be determined based on the high-dimensional sparse feature. In some embodiments, the machine learning model may be determined by the processing engine 112 (e.g., the determination module 304, or the machine learning model determination unit 312). Alternatively, the machine learning model may be determined by another computing device (or a processor thereof), and the processing engine 112 may in 406 obtain the machine learning model from the another computing device (or a storage device that stores the machine learning model). For the purposes of brevity and illustration, only the processing engine 112 is used to describe the process of determining the machine learning model, but one having ordinary skills in the art would understand that a different processor may execute the process of determining the machine learning model.

In some embodiments, the machine learning model may include factorization machine (FM), field-aware factorization machine (FFM), or any other model including factorizing high-order parameter (e.g., second-order parameter, third-order parameter), or the like, or any combination thereof. For example, the processing engine 112 may determine FM as a machine learning model and train the FM based on the high-dimensional sparse feature.

For example, for a second-order polynomial, the processing engine 112 may determine the FM as:

$$y(x)=w_0+\Sigma_{i=1}^{n}w_i x_i+\Sigma_{i=1}^{n-1}\Sigma_{j=i+1}^{n}(v_i,v_j)x_i x_j \qquad (1),$$

where y(x) represents an ETA for a target route, i (i=1, 2, ..., n) and j (j=i+1, i+2, ..., n) represent the sequence of x, n represents the number of feature items of the high-dimensional sparse feature, $x_i$ represents $i_{th}$ feature item of the high-dimensional sparse feature, $x_j$ represents $j_{th}$ feature item of the high-dimensional sparse feature, $w_0$ represents a constant parameter, $w_i$ represents a monomial parameter of $x_i$, $(v_i, v_j)$ represents a second-order parameter of $x_i x_j$, $v_i$ represents an implicit vector of $i_{th}$ feature item, and $v_j=v_i^T$.

In some embodiments, the processing engine 112 may train the FM based on the high-dimensional sparse feature. For example, for the second-order polynomial, the processing engine 112 may determine travelling duration associated with a taxi hailing service order as y(x) and a high-dimensional sparse feature associated with the taxi hailing service order as x, and then the processing engine 112 may determine at least one of a constant parameter, a monomial parameter, and a second-order parameter of the FM.

In some embodiments, the processing engine 112 may determine FFM as the machine learning model. For example, if feature items of the high-dimensional sparse feature belong to more than one field, the processing engine 112 may determine FFM as the machine learning model. The FM may be a particular FFM that feature items of the high-dimensional sparse feature belongs to one field.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, a training set including a plurality of training samples may be used to train and/or generate a machine learning model.

In 408, the processing engine 112 (e.g., the determination module 304, or the machine learning model updating unit 314, or a different computing device) may update the machine learning model with an on-line learning method. For example, if the processing engine 112 records another on-demand service order, the processing engine 112 may obtain recent historical data related to the another on-demand service order and update the machine learning model based on the recent historical data. The recent historical data may include recent travelled distance and at least one recent feature. In some embodiments, the recent historical data may include at least one historical service order different from those included in the historical data used to determine the machine learning method described above. In some embodiments, the on-line learning method may be a method of optimizing a machine learning model based on the recent historical data.

Figure 7:
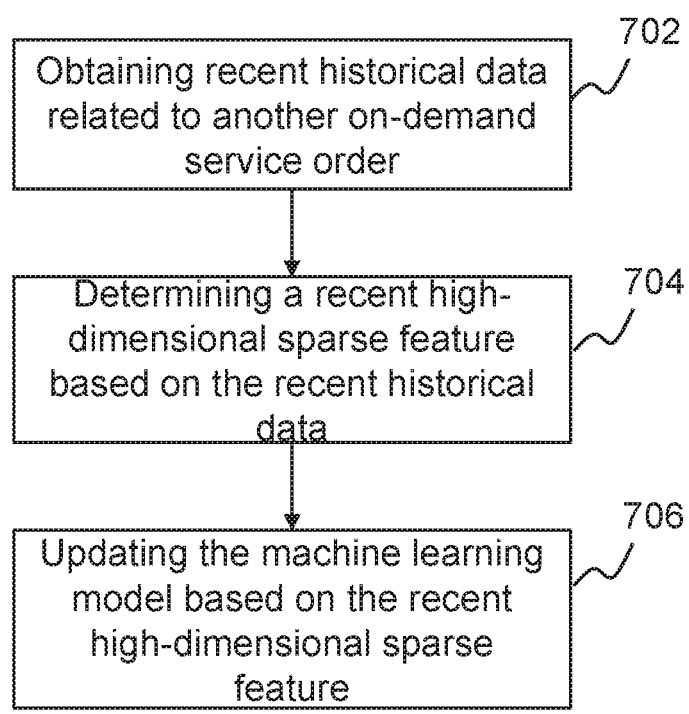
FIG. 7 is a flowchart illustrating an exemplary process for updating a machine learning model according to some embodiments of the present disclosure.

In some embodiments, step 408 of the process 400 may be performed based on the exemplary process 700 for updating the machine learning model illustrated in FIG. 7. In some embodiments, the process 700 may be executed by the on-demand service system 100. For example, the process 700 may be implemented as a set of instructions (e.g., an application) stored in storage 150, storage ROM 230 and/or RAM 240. The processing engine 112 may execute the set of instructions, and when executing the instructions, it may be configured to cause the server 110 to perform the process 700 in an online on-demand service platform. The platform may be an Internet-based platform that connects on-demand service providers and requestors through the Internet.

In 702, the processing engine 112 may obtain and/or extract recent historical data related to another on-demand service order. Step 702 may be performed in substantially the same manner as step 402.

In some embodiments, the another on-demand service order may be different from an on-demand service order which used to determine the machine learning model. In some embodiments, the recent historical data may be related to a plurality of on-demand service orders different from that used to determine the machine learning model. The plurality of on-demand service orders may be recorded within a time period. The time period may be a time period manually set by a user or an administrator of the on-demand service system 100, or adaptively set by the processing engine 112 (e.g., collecting a certain number of on-demand service orders).

In 704, the processing engine 112 may determine a recent high-dimensional sparse feature based on the recent historical data. The determination method of the recent high-dimensional sparse feature may be performed in substantially the same manner as step 404.

In 706, the processing engine 112 (e.g., the determination unit 304, or the machine learning model updating unit 314) may update the machine learning model base on the recent high-dimensional sparse feature. The updating method may be an on-line learning method. The on-line learning method may include follow the regularized leader (FTRL), online gradient descent (OGD), stochastic gradient descent (SGD), forward-backward splitting method (FOBOS), regularized dual averaging (RDA), or the like, or any combination thereof. For example, if the processing engine 112 determines a machine learning model including a parameter w based on the recent high-dimensional sparse feature, the processing engine 112 may update the parameter w of the machine learning model with FTRL by formula (2):

$$w_{t+1}=\mathrm{argmin}_w(\Sigma_{s=1}^{t}g_s w+\tfrac{1}{2}\Sigma_{s=1}^{t}\sigma_s\|w-w_s\|_2^2+\lambda_1\|w\|_1) \qquad (2),$$

where $w_{t+1}$ represents an updated parameter, t represents the number of iterations, w represents the parameter of the machine learning model, g represents a loss function for a gradient of w, $\Sigma_{s=1}^{t}\sigma_s=1/\eta_t$, $\eta_t$ represents learning rate, and $\lambda_1$ represents an L1-regularization coefficient. In some embodiments, the learning rate may decrease by the number of iterations increasing. In some embodiments, the L1-regularization coefficient may be zero.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Referring back to FIG. 4, in 410, the processing engine 112 (e.g., the determination module 304, or the ETA determination unit 316) may determine an ETA for a target route based on the machine learning model. For example, if the processing engine 112 receives a start location and a destination from a user device, the processing engine 112 may determine a target route based on the start location and the destination, and then determine an ETA for the target route based on the machine learning model. In some embodiments, the processing engine 112 may determine the ETA for the target route based on the machine learning model without updating. For example, the processing engine 112 may skip step 408 and proceed to step 410.

In some embodiments, step 410 may be implemented in an electronic device such a smartphone, a personal digital assistant (PDA), a tablet computer, a laptop, a carputer (board computer), a play station portable (PSP), a smart glasses, a smartwatch, a wearable devices, a virtual display device, display enhanced equipment (e.g. a Google™ Glass, an Oculus Rift, a HoloLens, or a Gear VR), or the like, or any combination thereof.

Figure 8:
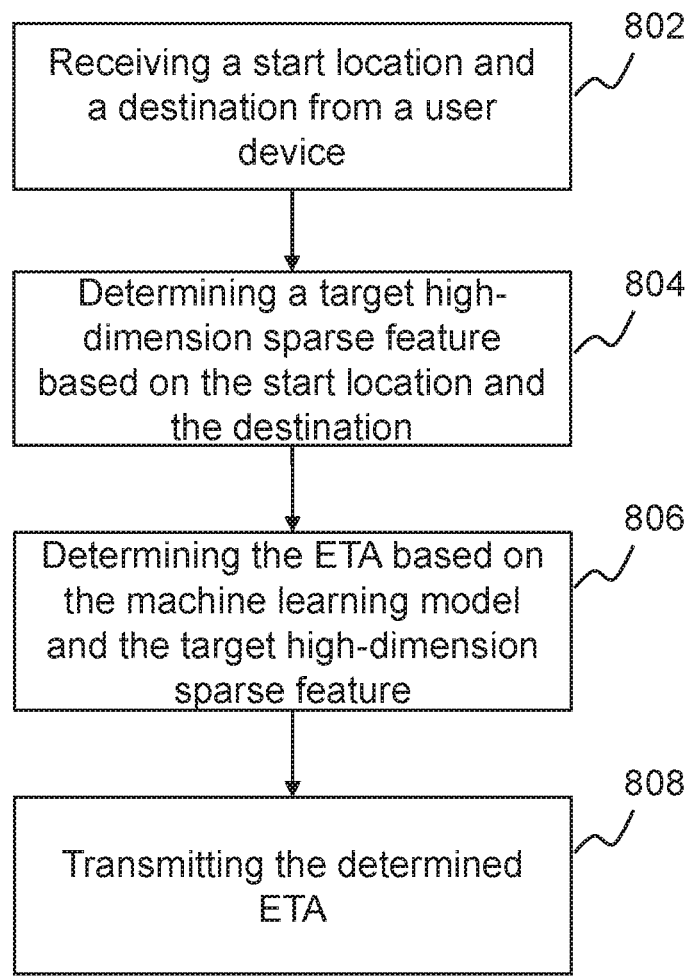
FIG. 8 is a flowchart illustrating an exemplary process for determining the ETA for the target route according to some embodiments of the present disclosure.

In some embodiments, step 410 of the process 400 may be performed based on the exemplary process 800 for determining the ETA for the target route illustrated in FIG. 8. In some embodiments, the process 800 may be executed by the on-demand service system 100. For example, the process 800 may be implemented as a set of instructions (e.g., an application) stored in storage 150, storage ROM 230 and/or RAM 240. The processing engine 112 may execute the set of instructions, and when executing the instructions, it may be configured to cause the server 110 to perform the process 800 in an online on-demand service platform. The platform may be an Internet-based platform that connects on-demand service providers and requestors through the Internet.

In 802, the processing engine 112 (e.g., the acquisition module 302) may receive a start location and a destination from a user device (e.g., the requester terminal 130). The start location and the destination may be associated with a request that may be sent by a passenger for a taxi hailing service. The on-demand service system 100 may receive the request and determine a target route based on the start location and the destination. In some embodiments, the target route may be obtained from the provider terminal 140, when a driver confirms or receives a service request from the on-demand service system 100. In some embodiments, the target route may be obtained from the requester terminal 130, when a passenger establish a request for a transportation service and confirm a service request transmitted from the on-demand service system 100. In some embodiments, the processing engine 112 may determine a plurality of target routes that may be associated with a map (e.g., a road-based map of Beijing) based on the start location and the destination, and the plurality of target routes may be directly or indirectly related to each other. In some embodiments, the target route may include a plurality of road sections as described elsewhere in the present disclosure, for example, in 502.

In 804, the processing engine 112 (e.g., the determination module 304) may determine a target high-dimension sparse feature based on the start location and the destination. In some embodiments, the target high-dimension sparse feature may include N dimensions, where the N may correspond to N features obtained from a target route including the start location and the destination. For example, if the processing engine 112 may select 2000 features from the target route, a vector including 2000 columns or 2000 rows may be determined as a target high-dimension sparse feature.

In some embodiments, dimensions of the target high-dimension sparse feature may be less than that of the high-dimension sparse feature. If one or more features in the target route are missed, the dimension of the target high-dimension sparse feature associated with the target route may decrease, and the target high-dimension sparse feature with deceased dimension (e.g., a vector with R columns or R rows, where R may be less than N). In some embodiments, if one or more features in the target route are missed, the processing engine 112 may determine a target high-dimension sparse feature still with N columns or N rows; and columns or rows associated with the missing feature may be described by a default value (e.g., a null).

In 806, the processing engine 112 (e.g., the determination module 304) may determine the ETA for the target route based on the machine learning model and the target high-dimension sparse feature. The processing engine 112 may determine the target high-dimension sparse feature as an input for the machine learning model, and the machine learning model may come into an output according to the input. For example, if a driver accepts a request for a taxi hailing service from the on-demand service system 100, the processing engine 112 may determine a target route with one or more road sections. The processing engine 112 may determine the target high-dimension sparse feature with N dimensions according to the target route, and the processing engine 112 may further determine the ETA for the target route by inputting the target high-dimension sparse feature into the machine learning model.

In 808, the processing engine 112 (e.g., the direction module 306) may transmit the determined ETA. In some embodiments, the determined ETA may be transmitted to the requester terminal 130 and/or the provider terminal 140 including an electronic device such a smartphone, a personal digital assistant (PDA), a tablet computer, a laptop, a board computer, a play station portable (PSP), a vehicle device, a smart glasses, a smartwatch, a wearable devices, a virtual display device, display enhanced equipment (e.g. a Google™ Glass, an Oculus Rift, a HoloLens, or a Gear VR), or the like, or any combination thereof. In some embodiments, the processing engine 112 may transmit the determined ETA to the provider terminal 140, a requester terminal 130, and/or any component of the on-demand service system 100 (e.g., the storage 150). The terminal(s) may display the received EAT in a user interface. In some embodiments, the determined ETA may be sent to a driver who may decide whether to select the target route for a service request (e.g., the driver may drive a taxi according to another route different with the target route).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system for determining an estimated time of arrival (ETA), comprising:
   a storage device storing a set of instructions; and
   at least one processor of an online on-demand service platform configured to communicate with the storage device, wherein when executing the set of instructions, the at least one processor is configured to cause the system to:
   receive a start location and a destination from a user device via a network;
   obtain a machine learning model for determining an ETA, wherein the machine learning model is generated according to a process for generating a machine learning model, the process including:
      obtaining historical data related to an on-demand service order,
      determining a high-dimensional sparse feature based on the historical data, wherein the high-dimensional sparse feature includes at least one feature corresponding to distance information of a route, and
      determining a machine learning model based on the high-dimensional sparse feature;
   determine an ETA for a target route based on the machine learning model, the start location, and the destination; and
   transmit, via the network, the determined ETA to the user device.

2. The system of claim 1, wherein to determine the high-dimensional sparse feature involves at least one of a gradient boosting decision tree (GBDT) algorithm or a one-hot encoding algorithm.

3. The system of claim 1, wherein to determine the high-dimensional sparse feature, the at least one processor is further configured to cause the system to:
   obtain a feature from the historical data;
   determine tree information based on the feature;
   determine a leaf node encoding based on the tree information; and
   determine the high-dimensional sparse feature based on the leaf node encoding.

4. The system of claim 1, wherein to determine the high-dimensional sparse feature, the at least one processor is further configured to cause the system to:
   obtain a feature from the historical data;
   determine whether the feature is a categorical feature;
   upon the feature being the categorical feature, determine an attribution corresponding to the feature;
   determine a one-hot encoding based on the attribution; and
   determine the high-dimensional sparse feature based on the one-hot encoding.

5. The system of claim 4, wherein to determine the high-dimensional sparse feature, the at least one processor is further configured to cause the system to:
   upon the feature being not the categorical feature, determine tree information based on the feature;
   determine a leaf node encoding based on the tree information; and determine the high-dimensional sparse feature based on the leaf node encoding and the one-hot encoding.

6. The system of claim 1, wherein to determine the machine learning model based on the high-dimensional sparse feature involves at least one of factorization machine (FM) or field-aware factorization machine (FFM).

7. The system of claim 1, wherein to obtain the machine learning model, the at least one processor is further configured to cause the system to update the machine learning model with an on-line learning method.

8. The system of claim 7, wherein the on-line learning method involves at least of follow the regularized leader (FTRL), online gradient descent (OGD), stochastic gradient descent (SGD), forward-backward splitting method (FOBOS), or regularized dual averaging (RDA).

9. The system of claim 7, wherein to update the machine learning model with the on-line learning method, the at least one processor is further configured to cause the system to:
obtain recent historical data related to another on-demand service order;
determine a recent high-dimensional sparse feature based on the recent historical data; and
update the machine learning model based on the recent high-dimensional sparse feature.

10. The system of claim 1, wherein the historical data includes at least one of basic route information, vehicle information, or provider information.

11. A method for determining an ETA, comprising:
receiving, by a server via a network, a start location and a destination from a user device;
obtaining, by the server, a machine learning model for determining an ETA, wherein the machine learning model is generated according to a process, the process including:
obtaining historical data related to an on-demand service order,
determining a high-dimensional sparse feature based on the historical data, wherein the high-dimensional sparse feature includes at least one feature corresponding to distance information of a route, and
determining a machine learning model based on the high-dimensional sparse feature;
determining, by the server, an ETA for a target route based on the machine learning model, the start location, and the destination; and
transmitting, by the server via the network, the determined ETA to the user device.

12. The method of claim 11, wherein the determining of the high-dimensional sparse feature involves at least one of a GBDT algorithm or a one-hot encoding algorithm.

13. The method of claim 11, wherein the determining of the high-dimensional sparse feature further includes:
obtaining a feature from the historical data;
determining tree information based on the feature;
determining a leaf node encoding based on the tree information; and
determining the high-dimensional sparse feature based on the leaf node encoding.

14. The method of claim 11, wherein the determining of the high-dimensional sparse feature further includes:
obtaining a feature from the historical data;
determining whether the feature is a categorical feature;
upon the feature being the categorical feature, determining an attribution corresponding to the feature;
determining a one-hot encoding based on the attribution; and
determining the high-dimensional sparse feature based on the one-hot encoding.

15. The method of claim 14, wherein the determining of the high-dimensional sparse feature further includes:
upon the feature being not the categorical feature, determining tree information based on the feature;
determining a leaf node encoding based on the tree information; and
determining the high-dimensional sparse feature based on the leaf node encoding and the one-hot encoding.

16. The method of claim 11, wherein the determining of the machine learning model based on the high-dimensional sparse feature involves at least one of FM or FFM.

17. The method of claim 11, wherein the obtaining of the machine learning model further includes:
updating, by the server, the machine learning model with an on-line learning method.

18. The method of claim 17, wherein the on-line learning method involves at least one of FTRL, OGD, SGD, FOBOS, or RDA.

19. The method of claim 17, wherein the updating of the machine learning model with the on-line learning method further includes:
obtaining recent historical data related to another on-demand service order;
determining a recent high-dimensional sparse feature based on the recent historical data; and
updating the machine learning model based on the recent high- dimensional sparse feature.

20. A non-transitory machine-readable storage medium including instructions that, when accessed by at least one processor of an online on-demand service platform, causes the at least one processor to:
receive a start location and a destination from a user device via a network;
obtain a machine learning model for determining an ETA, wherein the machine learning model is generated according to a process for generating a machine learning model, the process including:
obtaining historical data related to an on-demand service order,
determining a high-dimensional sparse feature based on the historical data, wherein the high-dimensional sparse feature includes at least one feature corresponding to distance information of a route, and
determining a machine learning model based on the high-dimensional sparse feature;
determine an ETA for a target route based on the machine learning model, the start location, and the destination; and
transmit, via the network, the determined ETA to the user device.

* * * * *